United States Patent
Naito et al.

[15] 3,673,113
[45] June 27, 1972

[54] PROCESS FOR PREPARING FLUORINATION CATALYST

[72] Inventors: Daiji Naito, Osaka; Shigeyoshi Ogawa, Takatsuki, both of Japan

[73] Assignee: Daikin Kogyo Co., Ltd., Osaka-shi, Osaka-fu, Japan

[22] Filed: Dec. 30, 1970

[21] Appl. No.: 102,926

[30] Foreign Application Priority Data

Dec. 30, 1969 Japan..................................45/1581

[52] U.S. Cl. ..............................252/441, 23/85, 260/658 R
[51] Int. Cl. ..........................................................B01j 11/78
[58] Field of Search.....................................252/441; 23/85

[56] References Cited

UNITED STATES PATENTS 2,745,886   5/1956   Ruh et al............................252/441 X
3,134,640   5/1964   Hengeveld et al. ........................23/85

*Primary Examiner*—Patrick P. Garvin
*Attorney*—Craig, Antonelli, Stewart & Hill

[57] ABSTRACT

A process for preparing a fluorination catalyst chromium oxyfluoride which comprises subjecting chromium fluoride to heat treatment at a temperature from 300° to 420° C. in the presence of oxygen and then subjecting the resulting product to heat treatment at a temperature from 500° to 700° C. in the absence of an active gas.

3 Claims, No Drawings

PROCESS FOR PREPARING FLUORINATION CATALYST

The present invention relates to a process for preparing a fluorination catalyst, chromium oxyfluoride. More particularly, it relates to a process for preparing an improved fluorination catalyst, chromium oxyfluoride, which is used in the gas phase fluorination of a halogenated hydrocarbon with hydrogen fluoride.

The term "halogenated hydrocarbon" used in this specification is intended to mean an aliphatic hydrocarbon which is partially or wholly halogenated with chlorine, bromine and/or fluorine atoms and has at least one chlorine or bromine atom.

It is known that chromium oxyfluoride can be used as a fluorination catalyst [U.S. Pat. No. 2,745,886]. That is, heat treatment of hydrated chromium fluoride at 340° to 750° C in the presence of oxygen yields chromium oxyfluoride useful as a fluorination catalyst. When the heating temperature is, however, not appropriately controlled, there is disadvantageously obtained such a catalyst as being short in the catalyst life or causing the decomposition of the starting halogenated hydrocarbon. Namely, the heating at 340° to 420° C affords a catalyst having a long catalyst life but showing an inclination to decompose the starting halogenated hydrocarbon. Thus, the use of such catalyst may result in the generation of heat sometimes reaching to 800° C so that the reaction apparatus is seriously damaged and the reaction operation becomes markedly difficult. On the other hand, the heating at 500° to 700° C produces a catalyst which does not decompose the starting halogenated hydrocarbon but is quite short in the catalyst life, so pulverized as not suitable for practical use or markedly low in the catalyst activity.

The main object of the present invention is to provide a chromium oxyfluoride catalyst overcoming the said disadvantages and defects, i.e. causing no decomposition of the starting halogenated hydrocarbon, showing a high catalyst activity and having a long catalyst life.

According to the present invention, such fluorination catalyst, chromium oxyfluoride, is obtained by heating chromium fluoride in the presence of oxygen at a temperature from 300° to 420° C and then heating the resulting product in the absence of any active gas at a temperature from 500° to 700° C.

The starting chromium fluoride can be either anhydrous or hydrated one. Examples of the hydrated chromium fluoride are $CrF_3 \cdot 3H_2O$, $CrF_3 \cdot 3\frac{1}{2}H_2O$, $CrF_3 \cdot 4H_2O$, $CrF_3 \cdot 6H_2O$, $CrF_3 \cdot 9H_2O$, etc. Among them, the use of $CrF_3 \cdot 3H_2O$ is the most favored. The starting chromium fluoride is normally in the form of powder, e.g. in 20 to 90 mesh. If necessary, it may be admixed with 0.5 to 10 percent by weight (favorably 1 to 3 percent by weight) of carbon, silica or the like on the basis of $CrF_3$. Prior to the activation in the present invention, the above starting material may be conveniently formed in an optional shape such as pellet.

The starting chromium fluoride appropriately formulated as above is first subjected to heat treatment in the presence of oxygen at a temperature of 200° to 420° C. The atmosphere under which the heating is carried out may consist of oxygen alone or its mixture with any inert gas. Usually, air is employed for the atmosphere. When anhydrous chromium fluoride is employed as the starting material, the coexistence of water is required and at least 2 percent by weight (preferably 6 to 40 percent by weight) of water on the basis of $CrF_3$ may be continuously supplied into the atmosphere under which heating is effected. In case of heating below 300° C, chromium fluoride is not sufficiently converted into chromium oxyfluoride and the ultimate catalyst product will be provided only with low catalyst activity. In case of heating above 420° C, the ultimate catalyst product will show a short catalyst life or take a powder form lacking a sufficient catalyst activity.

The thus obtained intermediate product is then subjected to heat treatment in the absence of any active gas at 500° to 700° C. The term "active gas" means a gas acting chemically on the said product such as oxidative or reductive gas (e.g. oxygen, air, carbon monooxide, chlorofluorohydrocarbons, chlorohydrocarbons). Thus, the heating is carried out in an atmosphere consisting of an inert gas (e.g. nitrogen, carbon dioxide, helium, argon, hydrogen fluoride, hydrogen chloride) alone or in vacuo. When heating is effected at a temperature below 500° C, the produced catalyst will disadvantageously decompose the starting halogenated hydrocarbon. When heating is performed at a temperature above 700° C, any disadvantage is not recognized on the catalyst product itself but such high temperature is unnecessary because a catalyst provided with satisfactory properties can be obtained by heating at a lower temperature.

Still, it should be avoided to heat the said intermediate product at a temperature higher than 420° C in the presence of oxidative or reductive gas, otherwise the catalyst property of the ultimate catalyst product will be unfavorably influenced. Thus, the elevation of the temperature from the first step to the second step is recommended to effect in an inert gas or in vacuo.

The catalyst product prepared as above is utilizable in the fluorination of a halogenated hydrocarbon usually having 1 to 4 carbon atoms and particularly suitable for the fluorination of a chlorofluorohydrocarbon or chlorohydrocarbon having two carbon atoms.

The catalyst of the present invention is advantageous in not decomposing the starting halogenated hydrocarbon, compared with the one obtained by heating in the presence of oxygen at a temperature of 300° to 420° C. It is also advantageous in having a long catalyst life and a high catalyst activity, compared with the one obtained by heating in the presence of oxygen at a temperature of 500° to 700° C. Further, in comparison with the one obtained by heat treatment in an inert gas at a temperature from 300° to 700° C, it is favorable in the possession of a higher catalyst activity and a longer catalyst life.

Practical and presently preferred embodiments of the present invention are illustratively shown in the following Examples.

EXAMPLE 1

Commercially available hydrated chromium fluoride confirmed to be $CrF_3 \cdot 3H_2O$ by differential thermal analysis and chemical analysis is admixed with 2 percent by weight of graphite, and the resultant mixture is tableted by a tableting machine to make tablets of 6 mm in thickness, 6 mm in diameter and 1.09 of apparent density. The obtained tablets (500 g) are charged extending over 266 mm into a Monel tube of 51 mm in inner diameter and 1,000 mm in length setted up in a vertical electric furnace. In the Monel tube, there is provided a tube of 1.5 mm in inner diameter and 3.5 mm in outer diameter in which a thermometer is inserted. Air is introduced into the Monel tube with a velocity of 7 l/min at room temperature (25° C), and the temperature of the furnace is raised up to 280° C in 4 hours. After maintenance of this temperature for 19 hours, the Monel tube is further heated up to 360° C for 1 hour and then kept at the same temperature for 10 hours. Nitrogen gas is introduced into the Monel tube with a velocity of 7 l/min, and the temperature is raised up to 600° C in 2 hours. Maintenance of this temperature for 8 hours affords the black product (300 g.).

EXAMPLE 2

As in Example 1, the tablets of hydrated chromium fluoride are prepared and charged into a Monel tube. Air is passed through the Monel tube at room temperature with a velocity of 7 l/min, and the temperature of the furnace is raised up to 280° C in 4 hours. After maintenance of this temperature for 12 hours, the Monel tube is further heated up to 320° C for 30 minutes and then kept at the same temperature for 20 hours. Nitrogen gas is indroduced into the Monel tube with a velocity of 7 l/min, and the temperature is raised up to 600° C in 2 hours. Maintenance of this temperature for 8 hours affords the black product.

EXAMPLE 3

As in Example 1, the tablets of hydrated chromium fluoride are prepared and charged into a Monel tube. Air is passed through the Monel tube at room temperature with a velocity of 7 l/min, and the temperature of the furnace is raised up to 280° C in 4 hours. After maintenance of this temperature for 19 hours, the Monel tube is further heated up to 320° C for 1 hour and then kept at the same temperature for 10 hours. Nitrogen gas is introduced into the Monel tube with a velocity of 7 l/min, and the temperature is raised up to 700° C in 3 hours. Maintenance of this temperature for 5 hours affords the black product.

EXAMPLE 4

As in Example 1, the tablets of hydrated chromium fluoride are prepared and charged into a Monel tube. Air is passed through the Monel tube at room temperature with a velocity of 7 l/min, and the temperature of the furnace is raised up to 280° C in 4 hours. After maintenance of this temperature for 5 hours, the Monel tube is further heated up to 400° C for 1.5 hours and then kept at the same temperature for 7 hours. Nitrogen gas is introduced into the Monel tube with a velocity of 7 l/min, and the temperature is raised up to 600° C in 2 hours. Maintenance of this temperature for 8 hours affords the black product.

REFERENCE EXAMPLE 1

Hydrated chromium fluoride is treated in the same manner as in Example 1 except that nitrogen gas is used in place of air and heat treatment at a temperature above 360° C is not performed. That is, the temperature is elevated from room temperature up to 280° C and, after maintenance of this temperature, elevated up to 360° C. Maintenance of the same temperature affords the green product (350 g).

REFERENCE EXAMPLE 2

Hydrated chromium fluoride is treated in the same manner as in Example 1 except that nitrogen gas is used in place of air. That is, the temperature is elevated from room temperature up to 280° C and, after maintenance of this temperature, elevated up to 360° C. After maintaining this temperature, elevation is made up to 600° C. Maintenance of the temperature affords the dark green product (330 g).

REFERENCE EXAMPLE 3

As in Example 1, the tablets (500 g) of hydrated chromium fluoride are prepared and charged into a Monel tube. Air is passed through the Monel tube at room temperature with a velocity of 7 l/min, and the temperature of the furnace is raised up to 280° C in 4 hours. After maintenance of this temperature for 19 hours, the Monel tube is further heated up to 360° C in 1 hour and then kept at the same temperature for 10 hours. Then, the temperature is elevated up to 600° C in 2 hours while the introduction of air is continued. At the temperature of 480° C, a large amount of reddish brown chromium trioxide begins to flow out of the Monel tube and, when reached at 530° C, the combustion of carbon is commenced. The temperature reaches 610° C in 1.5 hours after the start of elevation of the temperature, and the reaction is stopped. About half of the product is pulverized is in powder form and reveals no catalyst activity. The rest part of the product has only a low catalyst activity.

REFERENCE EXAMPLE 4

As in Example 1, the tablets (500 g) of hydrated chromium fluoride are prepared and charged into a Monel tube. Air is passed through the Monel tube at room temperature with a velocity of 0.6 l/min, and the temperature of the furnace is raised up to 500° C in 30 minutes and then up to 580° C in 10 minutes. After maintenance of this temperature for 2 hours, there is obtained the black product (290 g).

REFERENCE EXAMPLE 5

As in Example 1, the tablets (500 g) of hydrated chromium fluoride are prepared and charged into a Monel tube. Air is passed through the Monel tube at room temperature with a velocity of 7 l/min, and the temperature of the furnace is raised up to 280° C in 4 hours. After maintenance of this temperature for 19 hours, the Monel tube is further heated up to 360° C for 1 hour and then kept at the same temperature for 10 hours to give the brown product (320 g).

CATALYTIC ACTIVITY TEST

The catalyst (250 ml) obtained in the above mentioned Example or Reference Example is charged extending over 125 mm in height into a stainless steel reaction tube of 51 mm in inner diameter and 2,000 mm in length vertically setted up in an electric furnace. The upper part of 1,000 mm in length of the reaction tube is maintained at 300° C and used for preheating. In the reaction tube, there is provided a tube of stainless steel of 1.5 mm in inner diameter in which a thermometer is inserted. Into the reaction tube where the initial temperature is regulated to 330° C, a mixture of 1,1,2-trichlorotrifluoroethane and hydrogen fluoride in a molar ratio of 1 : 1.1 is introduced with a space velocity of 280 hr$^{-1}$. The gas flowing out of the reaction tube is passed through a water column, an alkali column and then a calcium chloride column, which are setted up in an air bath maintained at 80 ± 10° C, and is collected in a cooling trap employing dry-ice and trichlene. The gaseous product after passing through the calcium chloride column is subjected to gas chromatography. The composition of the product obtained in 3 hours after the start of the reaction is shown in Table 1 wherein the space velocity is calculated according to the following equation:

Space velocity (hr.$^{-1}$)

$$= \frac{\text{Feed amount of starting gas } (HF + C_2Cl_3F_3) \text{ (mol/hr.)}}{\text{Apparent volume of catalyst (l.)}} \times 22.4 \text{ (l./hr.)}$$

TABLE 1

| Catalyst prepared | Comp. of Product (mol %) | | | Chg. of temp. at primary stage of reaction (° C) | |
|---|---|---|---|---|---|
| | 1-Chloro-pentafluoroethane | 1,2-Dichloro-tetrafluoro-ethane | 1,1,2-Trichlorotri-fluoroethane | | |
| Ex. 1 | 4.3 | 85.2 | 10.5 | 330 | 336 |
| Ex. 2 | 3.9 | 83.8 | 12.5 | 330 | 335 |
| Ex. 3 | 4.1 | 84.3 | 11.6 | 330 | 335 |
| Ex. 4 | 4.5 | 85.6 | 9.9 | 330 | 336 |
| Ref. Ex. 1 | 0.4 | 17.8 | 81.8 | 330 | 330 |
| Ref. Ex. 2 | 1.0 | 50.4 | 48.6 | 330 | 330 |
| Ref. Ex. 3 | 2.9 | 64.3 | 32.8 | 330 | 340 |
| Ref. Ex. 4 | 3.2 | 69.1 | 27.7 | 330 | 348 |
| Ref. Ex. 5 | —* | | | 330 | 430 |

*Decomposition of halogenated hydrocarbons is extremely promoted, and the reaction is stopped 30 minutes after. In the decomposition product, $Cl_2$, $CO$, $CO_2$, $COCl_2$ and the like are detected.

The coefficient of catalyst life of the catalyst obtained in Example 1 or Reference Example 4 is calculated according to the following equation:

Coefficient of catalyst life $$= \frac{C_2Cl_2F_4 \text{ in halogenated hydrocarbons flowed out after a certain time from the start of the reaction (mol percent)}}{C_2Cl_2F_4 \text{ in halogenated hydrocarbons flowed out after 3 hours from the start of the reaction (mol percent)}}$$

The results are shown in Table 2.

TABLE 2

| Catalyst prepared | Time elapsed after start of reaction (Hrs) | Coefficient of catalyst life |
|---|---|---|
| Example 1 | 110 | 100 |
|  | 1500 | 100 |
|  | 3000 | 93 |
| Reference Example 4 | 110 | 91 |

What is claimed is:

1. A process for preparing a fluorination catalyst chromium oxyfluoride which comprises subjecting chromium fluoride to heat treatment at a temperature from 300° to 420° C in the presence of oxygen and then subjecting the resulting product to heat treatment at a temperature from 500° to 700° C in the absence of an active gas.

2. The process according to claim 1, wherein the starting chromium fluoride is $CrF_3 \cdot 3H_2O$.

3. The process according to claim 1, wherein the starting chromium fluoride is previously admixed with carbon or silica.

* * * * *